(12) United States Patent
Papa et al.

(10) Patent No.: US 10,294,873 B2
(45) Date of Patent: May 21, 2019

(54) AIRCRAFT BLEED SYSTEM

(71) Applicant: United Technologies Corporation, Farmington, CT (US)

(72) Inventors: Federico Papa, Ellington, CT (US); Bradley C Farnum, Tolland, CT (US); Kristin Kopp-Vaughan, East Hartford, CT (US); Nathan Roe, Newington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 289 days.

(21) Appl. No.: 15/420,808

(22) Filed: Jan. 31, 2017

(65) Prior Publication Data

US 2018/0216538 A1 Aug. 2, 2018

(51) Int. Cl.
| | |
|---|---|
| *F02C 9/18* | (2006.01) |
| *B64D 13/02* | (2006.01) |
| *B64D 13/08* | (2006.01) |
| *F02C 6/08* | (2006.01) |
| *B64D 13/00* | (2006.01) |
| *B64D 15/04* | (2006.01) |

(Continued)

(52) U.S. Cl.
CPC .............. *F02C 9/18* (2013.01); *B64D 13/006* (2013.01); *B64D 13/02* (2013.01); *B64D 13/08* (2013.01); *B64D 15/04* (2013.01); *F02C 6/08* (2013.01); *F02C 7/047* (2013.01); *F02C 7/185* (2013.01); *B64C 2230/04* (2013.01); *B64C 2230/06* (2013.01); *B64D 2013/0618* (2013.01); *B64D 2033/0233* (2013.01); *Y02T 50/675* (2013.01)

(58) Field of Classification Search
CPC .................................................... B64D 15/02
See application file for complete search history.

(56) References Cited

U.S. PATENT DOCUMENTS

| | | | | |
|---|---|---|---|---|
| 8,265,805 | B2 * | 9/2012 | Ma ..................... | B64D 15/22 340/963 |
| 8,495,857 | B2 * | 7/2013 | Papa ..................... | F02C 7/08 60/266 |

(Continued)

FOREIGN PATENT DOCUMENTS

| | | |
|---|---|---|
| EP | 2492199 | 8/2012 |
| EP | 286581 | 5/2015 |

OTHER PUBLICATIONS

EP Search Report dated Mar. 2, 2018 in EP Application No. 17202892.0.

*Primary Examiner* — Philip J Bonzell
*Assistant Examiner* — Michael B. Kreiner
(74) *Attorney, Agent, or Firm* — Snell & Wilmer, L.L.P.

(57) ABSTRACT

A method of controlling an aircraft bleed may include the steps of monitoring a temperature of a precooled airflow exiting a precooler, and determining a status of a wing anti-ice system of an aircraft. The wing anti-ice system may be configured to receive the precooled airflow from the precooler. The method may further comprise the steps of determining whether an engine operating condition of the aircraft is within an icing envelope, selecting a temperature set point for the precooled airflow based on the status of the wing anti-ice system and whether the aircraft is within an icing envelope, and modulating a fan airflow from a fan to the precooler to adjust the temperature of the precooled airflow to the temperature set point.

20 Claims, 6 Drawing Sheets

(51) Int. Cl.
*F02C 7/047* (2006.01)
*F02C 7/18* (2006.01)
*B64D 13/06* (2006.01)
*B64D 33/02* (2006.01)

(56) References Cited

U.S. PATENT DOCUMENTS

| | | | | |
|---|---|---|---|---|
| 8,955,794 | B2* | 2/2015 | Mackin | F02C 6/08 |
| | | | | 244/134 R |
| 8,967,528 | B2* | 3/2015 | Mackin | F02C 6/08 |
| | | | | 244/53 R |
| 9,038,397 | B2* | 5/2015 | Papa | F02C 7/14 |
| | | | | 60/266 |
| 9,810,158 | B2* | 11/2017 | Foutch | F02C 9/18 |
| 9,914,543 | B2* | 3/2018 | Meis | B64D 15/20 |
| 10,054,051 | B2* | 8/2018 | Foutch | F02C 7/047 |
| 2015/0107261 | A1* | 4/2015 | Moes | B64D 13/06 |
| | | | | 60/783 |
| 2015/0268073 | A1* | 9/2015 | Gaully | B64D 13/00 |
| | | | | 702/47 |
| 2015/0275758 | A1 | 10/2015 | Foutch | |
| 2017/0106985 | A1* | 4/2017 | Stieger | B64D 13/06 |
| 2018/0057170 | A1* | 3/2018 | Sautron | B64D 13/02 |

* cited by examiner

AIRCRAFT BLEED SYSTEM

FIELD

The present disclosure relates to air bleed systems for an aircraft, and, more specifically, to temperature and flow regulation for aircraft bleed systems.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Inlets for aircraft nacelles, wing leading edges, horizontal stabilizers, vertical fins, and other aircraft components may be subject to ice build-up during flight. A heat source may heat the components to prevent the ice build-up or to remove ice after it has built up. The heat source commonly used is hot bleed air from the gas turbine engine that heats the backside of the external surface subject to ice build-up. Engine bleed air may also be used for aircraft environmental control systems. Aircraft environmental control systems maintain aircraft cabin air pressures and temperatures within a target range for the safety and comfort of aircraft passengers.

SUMMARY

An aircraft bleed system is provided. The aircraft bleed system may comprise a precooler configured to receive a pressurized airflow from at least one of a compressor case, a diffuser case, or a turbine case. The precooler may be configured to receive a fan airflow from a fan and may be configured to deliver a precooled airflow to a wing anti-ice system. A fan air valve may be configured to regulate the fan airflow to the precooler. A controller may be coupled to the fan air valve and to the wing anti-ice system. A tangible, non-transitory memory may be configured to communicate with the controller. The tangible, non-transitory memory may have instructions stored thereon that, in response to execution by the controller, cause the controller to perform operations comprising determining a status of the wing anti-ice system, determining whether an engine operating condition is within an icing envelope, selecting a temperature set point for the precooled airflow based on the status of the wing anti-ice system and whether the engine operating condition is within the icing envelope, and modulating the fan airflow from the fan to the precooler to adjust a temperature of the precooled airflow to the temperature set point.

In various embodiments, the wing anti-ice system configured to receive the precooled airflow from the precooler. The operations may further comprise reducing the temperature set point for the precooled airflow in response to the wing anti-ice system being active and the engine operating condition being outside the icing envelope. The icing envelope may comprise an altitude and an ambient temperature range in which the wing anti-ice system is expected to operate to prevent ice formation on an aircraft. The modulating of the fan airflow into the precooler may be by positioning the fan air valve, and the operations may further comprise calculating a position of the fan air valve based on the temperature set point for the precooled airflow. The operations may further comprise increasing the fan airflow by positioning the fan air valve to reduce the temperature of the precooled airflow. Increasing the fan airflow may reduce a temperature of an exhaust airflow exiting the precooler. A temperature sensor may be disposed downstream of the precooler and configured to measure a temperature of a precooled airflow exiting the precooler.

An article of manufacture is also provided and may include a non-transitory, tangible computer readable storage medium having instructions stored thereon that, in response to execution by a controller, cause the controller to perform operations comprising determining a status of a wing anti-ice system, determining whether an engine operating condition is within an icing envelope, selecting a temperature set point for a precooled airflow from a precooler based on the status of the wing anti-ice system and whether the engine operating condition is within the icing envelope, and modulating a fan airflow from a fan to the precooler to adjust a temperature of the precooled airflow to the temperature set point.

In various embodiments, the operations may further comprise reducing the temperature set point for the precooled airflow in response to the wing anti-ice system being active and the engine operating condition being outside the icing envelope. The icing envelope may comprise an altitude and an ambient temperature range in which the wing anti-ice system is expected to operate to prevent ice formation on an aircraft. The modulating the fan airflow into the precooler may be by positioning a fan air valve. The operations may further comprise calculating a position of the fan air valve based on the temperature set point for the precooled airflow. The operations may further comprise increasing the fan airflow by positioning the fan air valve to reduce the temperature of the precooled airflow. The operations may further comprise reducing the temperature of the precooled airflow by increasing the fan airflow to the precooler. Increasing the fan airflow may reduce a temperature of an exhaust airflow exiting the precooler.

A method of controlling an aircraft bleed system is also provided. The method may comprise the steps of monitoring, by a controller, a temperature of a precooled airflow exiting a precooler, and determining, by the controller, a status of a wing anti-ice system of an aircraft. The wing anti-ice system may be configured to receive the precooled airflow from the precooler. The method may further comprise the steps of determining, by the controller, whether an engine operating condition of the aircraft is within an icing envelope, selecting, by the controller, a temperature set point for the precooled airflow based on the status of the wing anti-ice system and whether the aircraft is within an icing envelope, and modulating, by the controller, a fan airflow from a fan to the precooler to adjust the temperature of the precooled airflow to the temperature set point.

In various embodiments, the method may further comprise reducing the temperature set point for the precooled airflow in response to the wing anti-ice system being active and the engine operating condition being outside the icing envelope. The modulating the fan airflow into the precooler may be by positioning a fan air valve, and calculating a position of the fan air valve based on the temperature set point for the precooled airflow. The method may further comprise increasing the fan airflow by positioning the fan air valve to reduce the temperature of the precooled airflow. The method may further comprise monitoring a pressurized airflow from a compressor section of the aircraft into the precooler, and monitoring a speed of the fan, wherein calculating a position of the fan air valve is further based on at least one of the pressurized airflow from the compressor section or the speed of the fan. The method may further comprise reducing the temperature of the precooled airflow by increasing the fan airflow to the precooler. Increasing the fan airflow may reduce a temperature of an exhaust airflow exiting the precooler.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine. The term "upstream" is used to refer to directions and positions located closer to the source than directions and positions referenced as "downstream."

Figure 1:
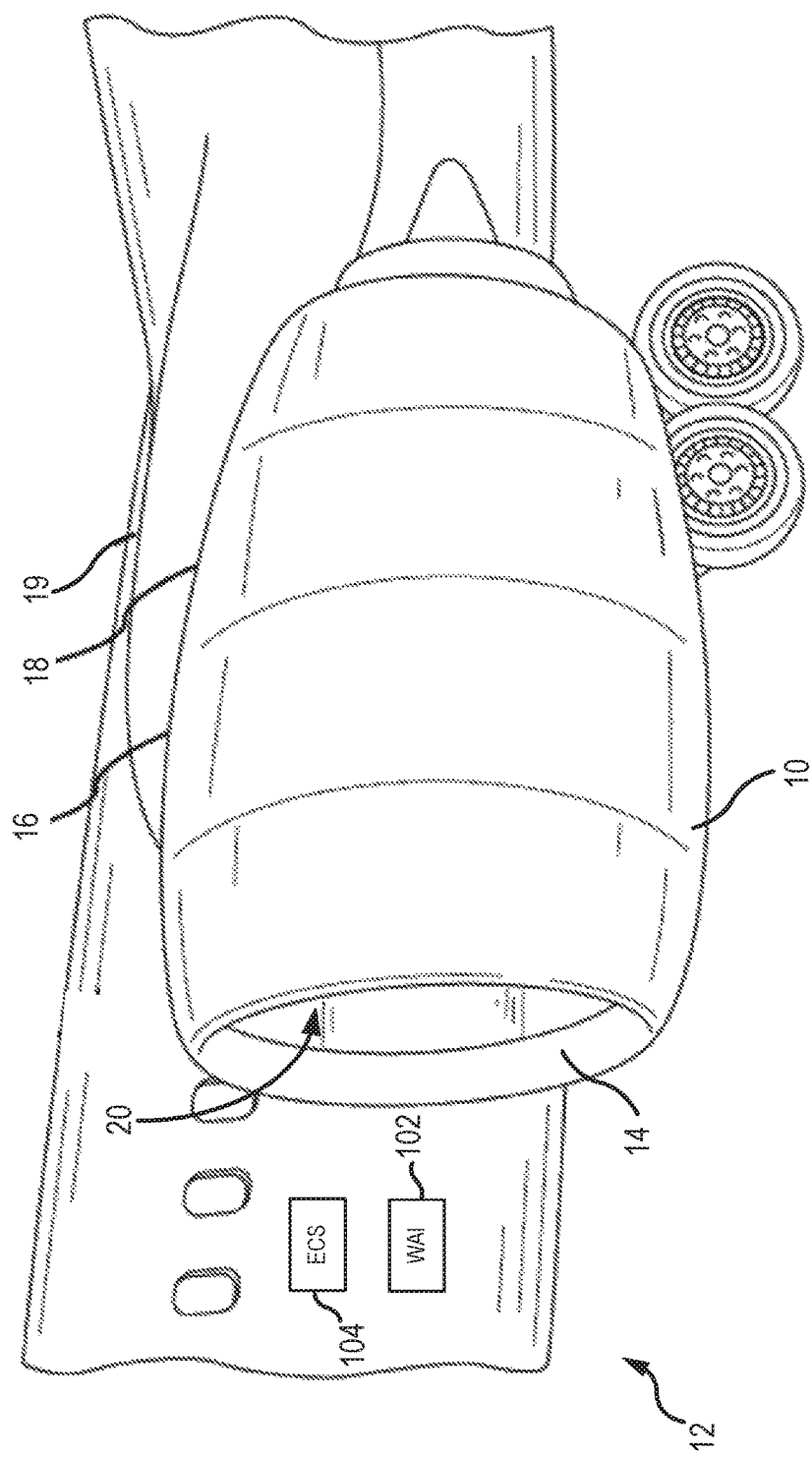
FIG. 1 illustrates a perspective view of a nacelle for a gas turbine engine, in accordance with various embodiments.

Referring to FIG. 1, a nacelle 10 for a gas turbine engine 20 of an aircraft 12 is shown according to various embodiments. Nacelle 10 may comprise an inlet 14, a fan cowl 16, and a thrust reverser 18. Nacelle 10 may be coupled to a pylon 19, which may mount the nacelle 10 to a wing or a body of the aircraft 12. The nacelle 10 may be disposed about a centerline, which may also be the axis of rotation of an engine gas turbine engine located within the nacelle 10.

At certain altitudes and ambient temperatures, referred to as an icing envelope 200 (see FIG. 4), ice may build up on the inlet 14 or on portions of the aircraft wing or aircraft body, as illustrative examples. Aircraft 12 may comprise a wing anti-ice (WAI) system 102 configured to prevent ice build-up and/or to remove ice that has already been built-up on aircraft components. WAI system 102 may use precooled bleed air, such as precooled airflow 140 (of FIG. 3), from gas turbine engine 20 to impinge on the backside of aircraft components (e.g., the backside of inlet 14) and heat the aircraft components to melt ice or prevent ice build-up.

Aircraft 12 may further comprise an environmental control system (ECS) 104 configured to circulate air to the cabin of the aircraft 12. ECS 104 may also receive precooled bleed air, such as precooled airflow 140 (of FIG. 3), from gas turbine engine 20. ECS 104 may further cool and filter the precooled bleed air to a desired cabin temperature prior to conducting the air to the cabin.

The present disclosure relates to an aircraft bleed system, which delivers air at a specific temperature or range of temperatures that is below the engine offtake temperature. Some of the air going to the aircraft 12 may be for WAI system 102. To achieve the desired temperature for the aircraft the aircraft bleed system may comprise a precooler configured to receive a pressurized airflow from an engine and fan airflow from a fan, configured to deliver a precooled bleed airflow to the aircraft. In various embodiments, the wing anti-ice system configured to receive the precooled bleed airflow from the precooler and the aircraft bleed system may be activated outside of the icing envelope.

Figure 2:
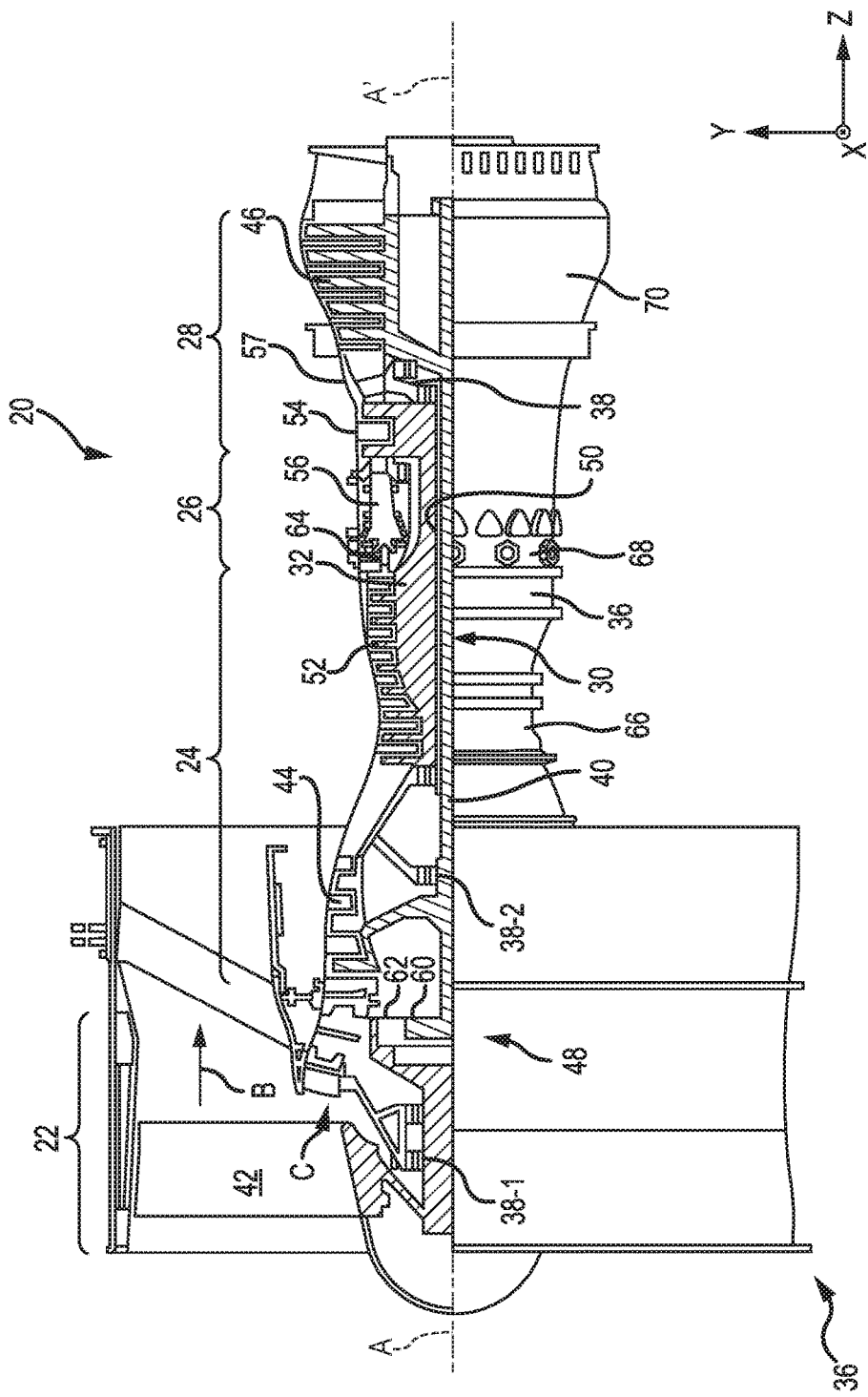
FIG. 2 illustrates a cross-sectional view of an exemplary gas turbine engine, in accordance with various embodiments.

With reference to FIG. 2, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure or engine case 36 via several bearing systems 38, 38-1, and 38-2. Engine central longitudinal axis A-A' is oriented in the z direction on the provided xyz axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A diffuser 64 may be located generally between high pressure compressor 52 and combustor 56. Engine case 36 may comprise portions disposed around compressors 44, 52, diffuser 64 and/or turbines 46, 54. In that regard, engine case 36 may include a compressor case 66, a diffuser case 68, a turbine case 70 and/or other case portions. A mid-turbine frame 57 of engine case 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 3:
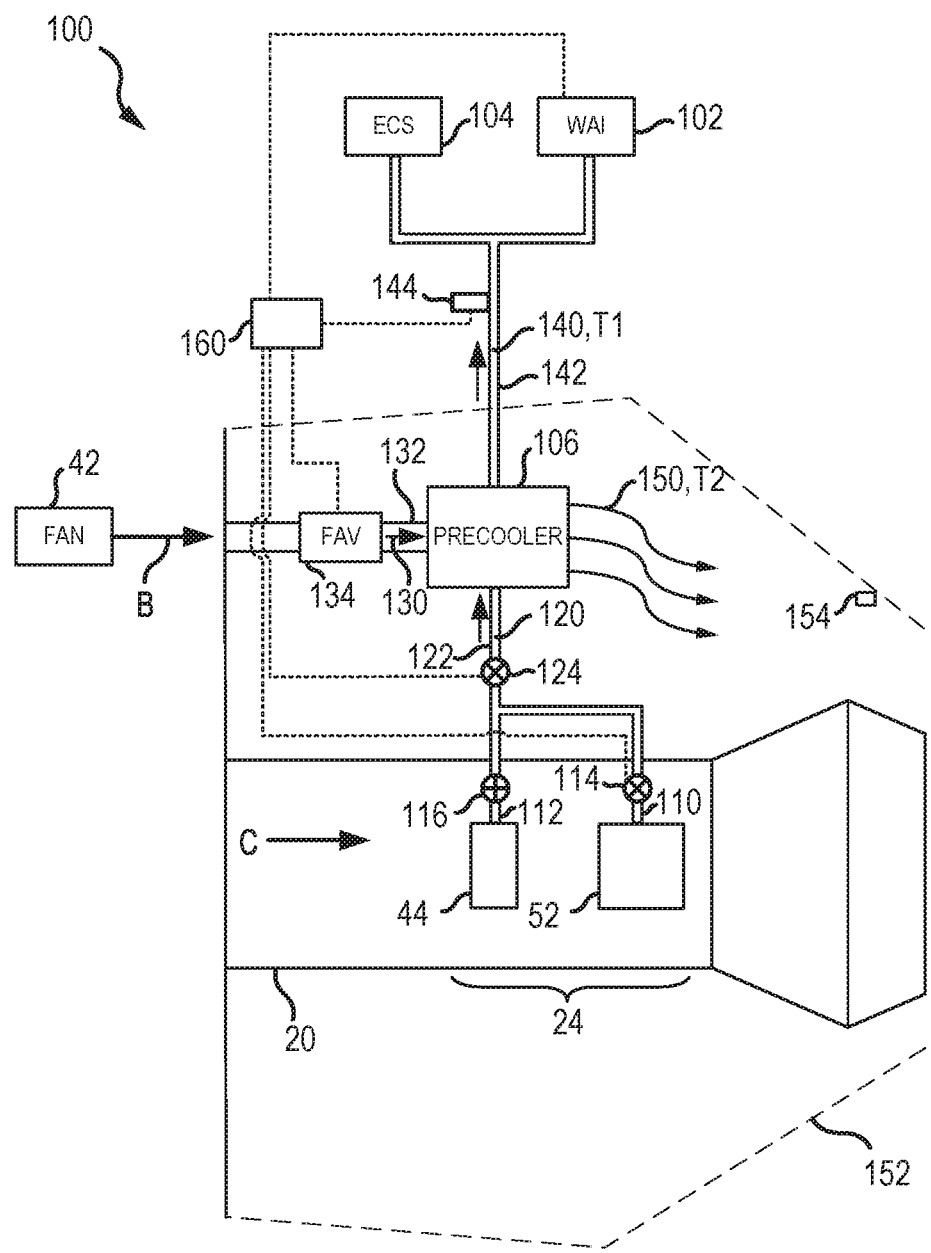
FIG. 3 illustrates a schematic view of a gas turbine engine including an environmental control system, in accordance with various embodiments.

With reference to FIG. 3, a schematic view of a portion of a gas turbine engine 20 including an aircraft bleed system 100 is shown according to various embodiments. Aircraft bleed system 100 may be configured to cool the air bled from gas turbine engine 20 and deliver the cooled bleed air to the aircraft 12 (see FIG. 1), such as to ECS 104, WAI system 102, or other aircraft component. In various embodiments, WAI system 102 may comprise ducts, valves, and other components that are configured to prevent ice build-up and/or to remove ice that has already been built-up on aircraft components. Aircraft bleed system 100 may comprise a precooler 106, which operates as a heat exchanger configured to receive hot air, which is bled from a section of gas turbine engine 20, such as compressor section 24, turbine section 28 or other engine section, or more specifically, which is bled from compressor case 66, diffuser case 68, and/or turbine case 70 (see FIG. 2). Precooler 106 may be configured to receive a pressurized airflow 120 from ports of at least one of low pressure compressor 44 and/or high pressure compressor 52. Pressurized airflow 120 may be supplied to the precooler 106 via supply conduit 122 configured to deliver pressurized airflow 120 from a high pressure bleed port 110 and/or low pressure bleed port 112 based on engine operating parameters.

High pressure bleed air may be supplied through high pressure bleed port 110 from the high pressure compressor 52 of gas turbine engine 20. A high pressure bleed valve 114 (e.g., a pressure regulating valve) may be coupled to high pressure bleed port 110. High pressure bleed air may be initially supplied to high pressure bleed valve 114, and high pressure bleed valve 114 may initially regulate pressure from high pressure bleed port 110.

Low pressure bleed air may be supplied through low pressure bleed port 112 from the low pressure compressor 44 of gas turbine engine 20. A low pressure bleed valve 116 (e.g., a pressure regulating valve and/or a check valve) may be coupled to a low pressure bleed port 112. In various embodiments, low pressure bleed valve 116 may be a check valve, which prevents high pressure air from back flowing to low pressure compressor 44.

Aircraft bleed system 100 may comprise a pressure regulating valve 124 coupled to supply conduit 122. In operation, high pressure bleed port 110 and/or low pressure bleed port 112 may supply air to pressure regulating valve 124. Pressure regulating valve 124 may regulate the air flow and/or pressure of pressurized airflow 120 into precooler 106. Stated differently, pressure regulating valve 124 is configured to modulate the mass flow of air (i.e., mass of air per unit time) though the supply conduit 122. The pressure of pressurized airflow 120 supplied to precooler 106 from pressure regulating valve 124 may be sufficiently reduced for cooling and/or handling in precooler 106. Supply conduit 122 may include other valves, such as a flow control valve, pressure regulator valve, a shut-off valve, and/or other suitable type of valve.

Precooler 106 is disposed downstream of pressure regulating valve 124 and is configured to cool the pressurized airflow 120 supplied by supply conduit 122. Bypass airflow B flows along a bypass flowpath from fan 42. A portion of bypass airflow B is used by precooler 106 to cool the pressurized airflow 120 from supply conduit 122. Precooler 106 receives cool fan air, i.e., fan airflow 130, through a fan air conduit 132. A fan air valve (FAV) 134 may be coupled to fan air conduit 132 to regulate the quantity of bypass airflow B passing through fan air conduit 132 to precooler 106. Precooler 106 uses the fan airflow 130 to remove heat from the pressurized airflow 120 from supply conduit 122. Thus, pressurized airflow 120 is the hot input and fan airflow 130 is the cold input for precooler 106. Precooler 106 may be an air-to-air heat exchanger that reduces the temperature of pressurized airflow 120, a process referred to as precooling. Precooler 106 may output a precooled airflow 140 as well as an exhaust airflow 150. Precooled airflow 140 may be directed through precooled air conduit 142 to one or more aircraft systems, such as ECS 104, WAI system 102, or other system. Exhaust airflow 150 from precooler 106 may be exhausted into a core compartment 152 of gas turbine engine 20.

Aircraft bleed system 100 may comprise a temperature sensor 144 disposed downstream of precooler 106. Temperature sensor 144 may be configured to measure a temperature T1 of precooled airflow 140 exiting precooler 106. Aircraft bleed system 100 may be configured to control the temperature T1 of precooled airflow 140, by detecting engine operating conditions, and by controlling, based on the detected conditions, a position of fan air valve 134. Aircraft bleed system 100 may be configured to control a position of fan air valve 134 to control the mass flow of fan airflow 130 into precooler 106. By controlling a mass flow of fan airflow 130 into precooler 106, a temperature T1 of the precooled airflow 140 exiting precooler 106 is controlled by aircraft bleed system 100. Additionally, aircraft bleed system 100 may be configured to control a temperature T2 of exhaust airflow 150 exiting precooler 106.

Exhaust airflow 150 from precooler 106 flows into core compartment 152. A temperature of core compartment 152 may be monitored by a temperature sensor 154. Engine operating conditions, including the temperature of exhaust airflow 150, may contribute to the core compartment temperature. If the temperature of exhaust airflow 150 is too high, the core compartment 152 may overheat. For example, if a temperature of the exhaust airflow 150 from precooler 106 is too high, the temperature in core compartment 152 may trigger the fire alarm, despite the absence of a fire. The temperature T2 of the exhaust airflow 150 may be reduced by aircraft bleed system 100 under certain engine operating conditions in order to prevent core compartment 152 from overheating. Aircraft bleed system 100 may reduce the temperature T2 of the exhaust airflow 150 when the aircraft is outside an icing envelope 200 (see FIG. 4).

Figure 4:
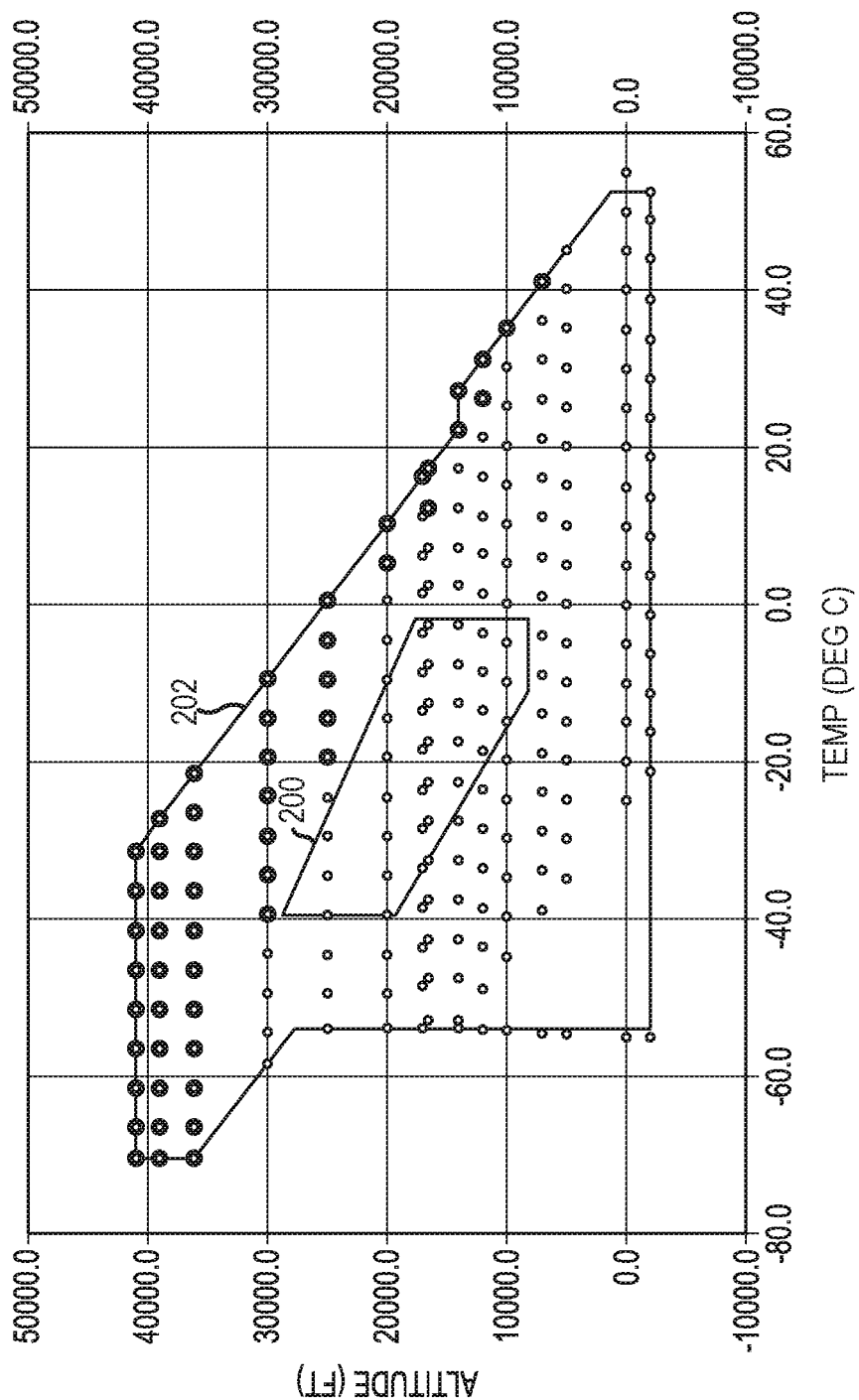
FIG. 4 illustrates a graphical view of an icing envelope for an aircraft, in accordance with various embodiments.

Referring now to FIG. 4 and still to FIG. 3, a graphical view of an icing envelope for an aircraft is shown in accordance with various embodiments. An icing envelope 200 may represent engine operating conditions, such as a range of altitudes and ambient temperatures, in which a WAI system 102 is expected to operate to prevent ice formation on the wings of the aircraft. Icing envelope 200 may represent an icing envelope defined by a government agency, such as the Federal Aviation Administration (FAA) in the United States. A horizontal axis of the graph represents static ambient temperature (outside air temperature) in degrees Celsius (° C.). A vertical axis of the graph represents altitude of the aircraft measured in feet (ft).

Within the icing envelope 200, WAI system 102 may be activated by a pilot or by a control system. In response to activating WAI system 102, precooled airflow 140 flows to WAI system 102, which uses the precooled airflow 140 to prevent or remove ice buildup on the wings of the aircraft. When WAI system 102 is activated, the precooled airflow 140 may be divided among WAI system 102, ECS 104 and/or other aircraft systems. Aircraft bleed system 100 may increase the flow through precooler 106 in order to accommodate the additional usage of precooled airflow 140 by WAI system 102. For example, the flow into precooler 106 may be increased by modulating the pressure regulating valve 124 to increase the pressure and/or mass flow of pressurized airflow 120.

In typical systems, activating a wing anti-ice system when the operating conditions are outside of icing envelope 200 may increase the likelihood that the core compartment will overheat. To avoid increasing the core compartment temperature beyond the threshold when outside of icing envelope 200, typical systems may limit the airflow to the environmental control system.

It may be desirable to activate WAI system 102 when the environmental conditions are outside icing envelope 200 without limiting airflow to the aircraft systems and without overheating core compartment 152. Aircraft bleed system 100 disclosed herein is configured to maintain a temperature T2 of exhaust airflow 150 below a threshold even when WAI system 102 is activated while when the engine operating conditions are outside of icing envelope 200. In various embodiments, aircraft bleed system 100 may be configured to allow WAI system 102 to be used when the engine operating conditions are within an expanded envelope 202. Expanded envelope 202 may represent engine operating conditions (e.g., altitude and static ambient temperature) in which a WAI system 102 can be activated and aircraft bleed system 100 maintains a temperature T2 of exhaust airflow 150 below the threshold. Correlating the engine operating conditions of expanded envelope 202 to a total air temperature, i.e., the effective air temperature, aircraft bleed system 100 is configured to allow WAI system 102 to be activated when the total air temperature is 10° C. Aircraft bleed system 100 is configured to allow WAI system 102 to be activated while the aircraft is within the expanded envelope 202 without limiting airflow to ECS 104 or to other aircraft systems and without overheating core compartment 152. Aircraft bleed system 100 accomplishes this expanded envelope 202 of WAI system 102 operation by controlling the output temperatures of precooler 106 with modulation of fan airflow 130.

Returning to FIG. 3, the airflow inputs to precooler 106 include the pressurized airflow 120, which is regulated by pressure regulating valve 124, and the fan airflow 130, which is regulated by fan air valve 134. The airflow outputs from precooler 106 include the precooled airflow 140 and exhaust airflow 150. Aircraft bleed system 100 is configured to control a position of fan air valve 134 in order to meet the desired output conditions of precooler 106, such as the temperature T1 of precooled airflow 140 and temperature T2 of exhaust airflow 150.

Aircraft bleed system 100 may comprise a controller 160 in electronic communication (e.g., wired or wirelessly coupled) with temperature sensor 144, fan air valve 134, pressure regulating valve 124, high pressure bleed valve 114, and/or other components. Controller 160 may monitor a position of pressure regulating valve 124 and/or a position of high pressure bleed valve 114, or other information about pressurized airflow 120, such as a pressure of pressurized airflow 120. Controller 160 may further monitor a temperature T1 of a precooled airflow 140 exiting the precooler 106 and supplied to WAI system 102. In various embodiments, the controller 160 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof.

Controller 160 may be in communication with WAI system 102 and may be configured to determine a status of WAI system 102, i.e., whether WAI system 102 is active or inactive. Controller 160 may further be in communication with an aircraft data source, such as an avionics unit, and/or a plurality of sensors that detect engine operating conditions. Controller 160 may receive engine operating conditions, such as altitude of the aircraft, an ambient temperature, a speed of the aircraft, Mach number, a speed of fan or low speed spool 30 (FIG. 2), a speed of high speed spool 32 (FIG. 2), and other information.

Controller 160 may be configured to determine a temperature set point, i.e. a desired temperature, for precooled airflow 140 based on at least one of a status of WAI system 102 and whether the engine operating conditions of the aircraft are within the icing envelope 200 (FIG. 4). Controller 160 may control the temperature T1 of precooled airflow 140 and the temperature T2 of exhaust airflow 150 by regulating the fan airflow 130 into precooler 106. Controller 160 may be in communication with fan air valve 134 and configured to control one or more valve control devices of fan air valve 134. Controller 160 may determine a position of fan air valve 134 based on at least one of a position of pressure regulating valve 124, a position of high pressure bleed valve 114, a speed of fan 42, or an engine operating condition. A valve control device of fan air valve 134 may be configured to receive a command from controller 160 and to adjust or maintain a position of fan air valve 134. In various embodiments, valve control device of fan air valve 134 may include, for example, a torque motor servovalve, a solenoid, or other electromagnetic, electromechanical, or electrohydraulic control scheme, such as motorized valve, for example, including an actuator or other servomechanism.

Figure 5:
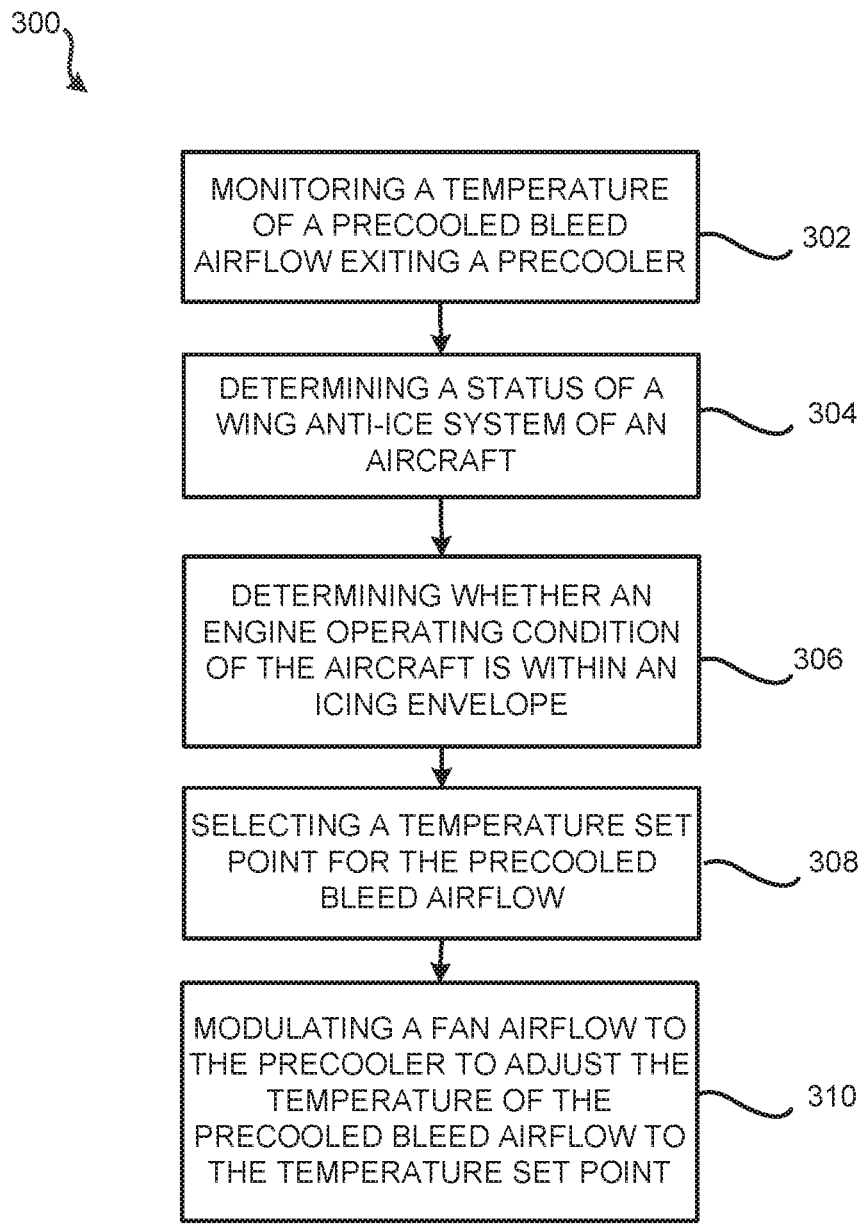
FIG. 5 illustrates a method of controlling an aircraft bleed system, in accordance with various embodiments.

With reference to FIG. 5, a method 300 of controlling an aircraft bleed system is shown in accordance with various embodiments. Method 300 may be performed by controller 160 and may include the steps of monitoring a temperature of a precooled airflow exiting a precooler (step 302), and determining a status of a wing anti-ice system of an aircraft (step 304). The wing anti-ice system may be configured to receive the precooled airflow from the precooler. Method 300 may further include the steps of determining whether an engine operating condition of the aircraft is within an icing envelope (step 306), selecting a temperature set point for the precooled airflow based on the status of the wing anti-ice system and whether the aircraft is within an icing envelope (step 308), and modulating a fan airflow from a fan to the precooler to adjust the temperature of the precooled airflow to the temperature set point (step 310).

Step 304 may further comprise receiving, by the controller, a status of the WAI system 102 from an aircraft data source. When WAI system 102 is active, aircraft bleed system 100 supplies precooled airflow to WAI system 102.

Step 306 may further comprise receiving, by the controller, an engine operating condition 400, and determining whether the aircraft is within the icing envelope based on an engine operating condition 400. In various embodiments, the engine operating condition 400 includes at least one of an altitude or an ambient temperature. Step 304 may further comprise determining whether the aircraft is within the icing envelope an altitude and an ambient temperature of the aircraft.

Step 308 may further comprise reducing the temperature set point for the precooled airflow 140 in response to the wing anti-ice system being active and the engine operating condition 400 being outside an icing envelope. Step 308 may further comprise selecting a first temperature set point for the precooled airflow 140 based on the WAI system 102 being inactive. The first temperature set point may be independent of whether the engine operating condition 400 of the aircraft is within an icing envelope 200.

Step 308 may further comprise selecting a second temperature set point for the precooled airflow 140 based on the WAI system 102 being active and based on the engine operating condition 400 of the aircraft being inside the icing envelope 200. The second temperature set point may be greater than the first temperature set point.

Step 308 may further comprise selecting a third temperature set point for the precooled airflow 140 based on the WAI system 102 being active and based on the aircraft being outside the icing envelope 200. The third temperature set point may be less than the first temperature set point.

Step 310 may further comprise modulating the fan airflow 130 into the precooler 106 by positioning a fan air valve 134, and calculating a position of the fan air valve 134 based on the temperature set point for the precooled airflow 140. Step 310 may further comprise increasing the fan airflow 130 by positioning the fan air valve 134 to reduce the temperature of the precooled airflow 140. Step 310 may further comprise monitoring a pressurized airflow 120 from a compressor section 24 of the aircraft into the precooler 106, and monitoring a speed of the fan 42, wherein calculating a position of the fan air valve 134 is further based on at least one of the pressurized airflow 120 from the compressor section or the speed of the fan 42. Step 310 may further comprise reducing the temperature of the precooled airflow 140 by increasing the fan airflow 130 to the precooler 106.

Figure 6:
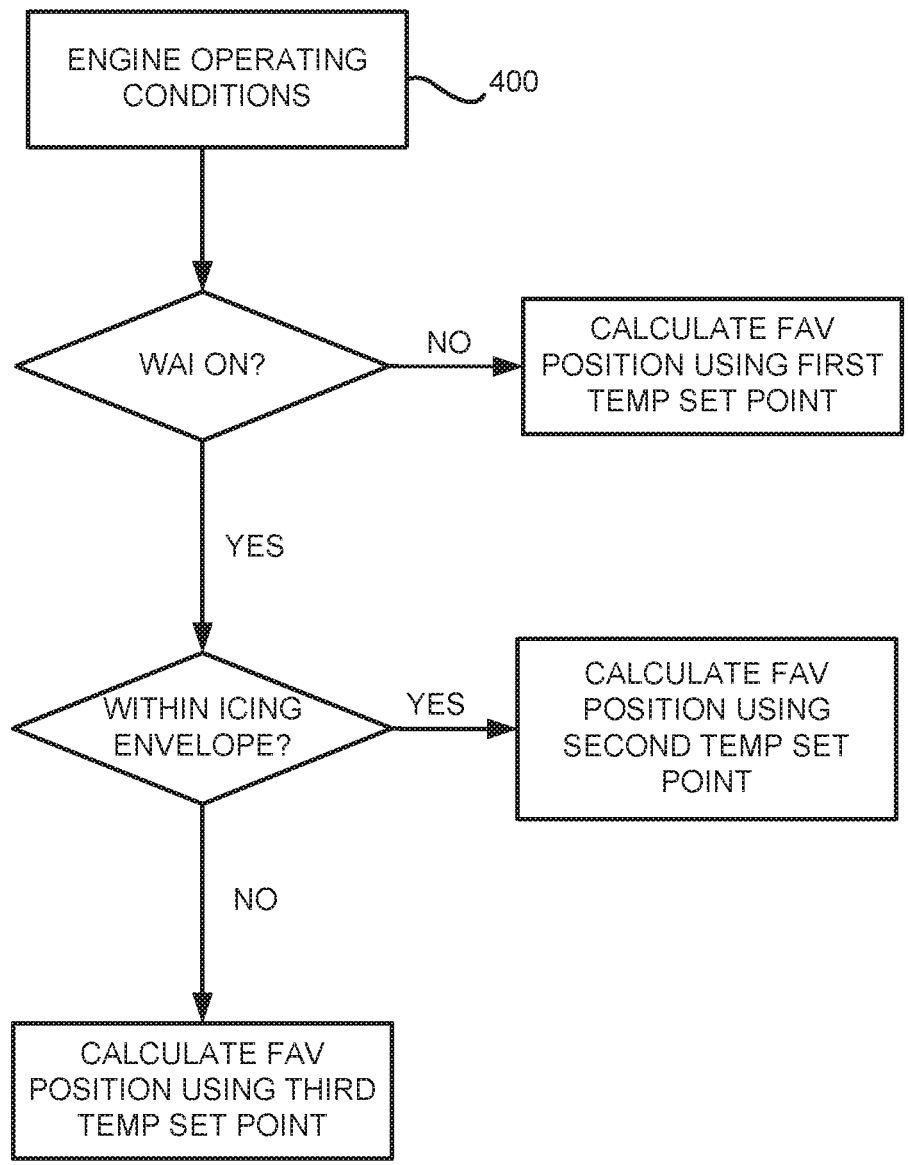
FIG. 6 illustrates a logical flow diagram for an aircraft bleed system, in accordance with various embodiments.

With reference to FIG. 6, a logical flow diagram for a controller 160 implementing method 300 for controlling aircraft bleed system 100 is shown in accordance with various embodiments. Controller 160 may receive data from WAI system 102, temperature sensor 144, temperature sensor 154, pressure regulating valve 124, high pressure bleed valve 114 and/or other sensors or data sources.

Controller 160 may determine that the WAI system 102 is off (inactive). If WAI system 102 is off, controller 160 may select a position of fan air valve 134 based on a first temperature set point.

Controller 160 may determine that the WAI system 102 is on (active). If WAI system 102 is on, controller 160 may then evaluate the environmental conditions X to determine if the aircraft 12 is within icing envelope 200. If WAI system 102 is on and the aircraft 12 is within icing envelope 200, controller 160 may select a position of fan air valve 134 based on a second temperature set point. The second temperature set point may be greater than the first temperature set point. If WAI system 102 is on and the aircraft 12 is outside icing envelope 200, controller 160 may select a position of fan air valve 134 based on a third temperature set point. The third temperature set point may be less than the first temperature set point. At the third set point, the fan air valve 134 is positioned to supply a greater mass flow of fan airflow 130. The mass flow of fan airflow 130 may be increased without restricting pressurized airflow 120 to precooler 106. The increased mass flow of fan airflow 130 at the input of precooler 106, reduces a temperature of the precooler outputs, namely, precooled airflow 140 and exhaust airflow 150. This fan air valve 134 setting may be used when WAI system 102 is active and the aircraft 12 is outside the icing envelope 200 (see FIG. 4), i.e. where a lower precooled airflow temperature is acceptable. The mass flow of exhaust airflow 150 increases while maintaining a temperature T2 of the exhaust airflow 150 below a desired threshold. By maintaining the temperature T2 of the exhaust airflow 150 below a desired threshold, aircraft bleed system 100 may prevent the core compartment 152 of the gas turbine engine 20 from overheating due to exhaust airflow when WAI system 102 is activated outside the icing envelope 200.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft bleed system, comprising:
   a precooler configured to receive a pressurized airflow from at least one of a compressor case, a diffuser case, or a turbine case, wherein the precooler is configured to receive a fan airflow from a fan and is configured to deliver a precooled airflow to a wing anti-ice system;
   a fan air valve configured to regulate the fan airflow to the precooler;
   a temperature sensor configured to measure a temperature of a core compartment;
   a controller coupled to the fan air valve and to the wing anti-ice system; and
   a tangible, non-transitory memory configured to communicate with the controller, the tangible, non-transitory memory having instructions stored thereon that, in response to execution by the controller, cause the controller to perform operations comprising:
   determining a status of the wing anti-ice system,
   determining whether an engine operating condition is within an icing envelope,
   selecting a temperature set point for the precooled airflow based on the status of the wing anti-ice system and whether the engine operating condition is within the icing envelope, and
   modulating the fan airflow from the fan to the precooler to adjust a temperature of the precooled airflow to the temperature set point and to maintain a temperature of an exhaust airflow from the precooler to the core compartment below a threshold temperature.

2. The aircraft bleed system of claim 1, wherein the wing anti-ice system configured to receive the precooled airflow from the precooler.

3. The aircraft bleed system of claim 2, wherein the operations further comprise reducing the temperature set point for the precooled airflow in response to the wing anti-ice system being active and the engine operating condition being outside the icing envelope, wherein the icing envelope comprises an altitude and an ambient temperature range in which the wing anti-ice system is expected to operate to prevent ice formation on an aircraft.

4. The aircraft bleed system of claim 3, wherein the modulating the fan airflow into the precooler is by positioning the fan air valve, and the operations further comprise calculating a position of the fan air valve based on the temperature set point for the precooled airflow.

5. The aircraft bleed system of claim 4, wherein the operations further comprise increasing the fan airflow by positioning the fan air valve to reduce the temperature of the precooled airflow.

6. The aircraft bleed system of claim 5, wherein increasing the fan airflow reduces the temperature of the exhaust airflow exiting the precooler.

7. The aircraft bleed system of claim 1, further comprising a temperature sensor disposed downstream of the precooler and configured to measure the temperature of a precooled airflow exiting the precooler.

8. An article of manufacture including a non-transitory, tangible computer readable storage medium having instructions stored thereon that, in response to execution by a controller, cause the controller to perform operations comprising:
   determining a status of a wing anti-ice system;
   measuring a temperature of a core compartment via a temperature sensor;
   determining whether an engine operating condition is within an icing envelope;
   selecting a temperature set point for a precooled airflow from a precooler based on the status of the wing anti-ice system and whether the engine operating condition is within the icing envelope; and
   modulating a fan airflow from a fan to the precooler to adjust a temperature of the precooled airflow to the temperature set point and to maintain a temperature of an exhaust airflow from the precooler to the core compartment below a threshold temperature.

9. The article of manufacture of claim 8, wherein the operations further comprise reducing the temperature set point for the precooled airflow in response to the wing anti-ice system being active and the engine operating condition being outside the icing envelope, wherein the icing envelope comprises an altitude and an ambient temperature range in which the wing anti-ice system is expected to operate to prevent ice formation on an aircraft.

10. The article of manufacture of claim 9, wherein the modulating the fan airflow into the precooler is by positioning a fan air valve, and wherein the operations further comprise calculating a position of the fan air valve based on the temperature set point for the precooled airflow.

11. The article of manufacture of claim 10, wherein the operations further comprise increasing the fan airflow by positioning the fan air valve to reduce the temperature of the precooled airflow.

12. The article of manufacture of claim 8, wherein the operations further comprise reducing the temperature of the precooled airflow by increasing the fan airflow to the precooler.

13. The article of manufacture of claim 12, wherein increasing the fan airflow reduces the temperature of the exhaust airflow exiting the precooler.

14. A method of controlling an aircraft bleed system, comprising:
   monitoring, by a controller, a temperature of a precooled airflow exiting a precooler;
   measuring, by a temperature sensor, a temperature of a core compartment;
   determining, by the controller, a status of a wing anti-ice system of an aircraft, the wing anti-ice system configured to receive the precooled airflow from the precooler;
   determining, by the controller, whether an engine operating condition of the aircraft is within an icing envelope;
   selecting, by the controller, a temperature set point for the precooled airflow based on the status of the wing anti-ice system and whether the aircraft is within the icing envelope; and
   modulating, by the controller, a fan airflow from a fan to the precooler to adjust the temperature of the precooled airflow to the temperature set point and to maintain a temperature of an exhaust airflow from the precooler to the core compartment below a threshold temperature.

15. The method of claim 14, further comprising reducing, by the controller, the temperature set point for the precooled airflow in response to the wing anti-ice system being active and the engine operating condition being outside the icing envelope, wherein the icing envelope comprises an altitude and an ambient temperature range in which the wing anti-ice system is expected to operate to prevent ice formation on an aircraft.

16. The method of claim 15, wherein the modulating the fan airflow is by positioning a fan air valve and calculating, by the controller, a position of the fan air valve based on the temperature set point for the precooled airflow.

17. The method of claim 16, further comprising increasing the fan airflow by positioning the fan air valve to reduce the temperature of the precooled airflow.

18. The method of claim 16, further comprising:
   monitoring, by the controller, a pressurized airflow from a compressor section of the aircraft into the precooler; and
   monitoring, by the controller, a speed of the fan, wherein calculating the position of the fan air valve is further based on at least one of the pressurized airflow from the compressor section or the speed of the fan.

19. The method of claim 14, further comprising reducing the temperature of the precooled airflow by increasing the fan airflow to the precooler.

20. The method of claim 19, wherein increasing the fan airflow reduces the temperature of the exhaust airflow exiting the precooler.

* * * * *